June 19, 1934.  F. A. BLASHFIELD ET AL  1,963,543

INSTRUMENT STERILIZER

Filed Feb. 17, 1932

Inventors:
Floyd A. Blashfield,
Gustave F. Linde,
By Cheever, Cox & Moore
attys.

Patented June 19, 1934

1,963,543

UNITED STATES PATENT OFFICE 1,963,543

INSTRUMENT STERILIZER

Floyd A. Blashfield and Gustave F. Linde, Madison, Wis., assignors to Scanlan-Morris Company, Madison, Wis., a corporation of Wisconsin Application February 17, 1932, Serial No. 593,512

1 Claim. (Cl. 236—20)

This invention relates to thermostatic controls.

In certain articles, particularly steam sterilizers used for sterilizing surgical instruments, etc., it is necessary that the water in which the instruments are sterilized be maintained at the boiling point at all times, otherwise the water would not have the necessary sterilizing effect. At the same time it is desirable that the water does not boil violently as the water would boil away too quickly, and furthermore it is undesirable to have too much steam evaporating into the atmosphere of the room or office where the sterilizer is used.

The primary object of the invention is to preserve the amount of water in an instrument sterilizer, prevent rapid evaporation of the water in the sterilizer and condense the vapor from the sterilizer and return it to the sterilizer.

Another object of the present invention is to provide a thermostatically controlled device for sterilizers whereby the thermostat bulb is arranged in a vapor vent pipe leading from the sterilizer and leading to atmosphere, the thermostat being operated by the amount of vapor passing through the vent pipe.

Another object is to provide a thermostat which is located, constructed, and arranged so as to keep the heat supply in the sterilizer at the lowest possible temperature for boiling the water, but at the same time preventing the water from boiling too rapidly or quickly so that a large amount of steam will pass through the vent pipe.

A further object is to provide a thermostat which has its bulb located in the vent pipe and in contact at all times with the vapor which passes through the vent pipe, the thermostat being prevented from operating a valve until the vapor passing through the vent pipe is of such a quantity as to cause expansion of the liquid or thermostatic element and consequent operation of the thermostat for shutting off the heat supply.

Numerous other objects and advantages will be apparent throughout the progress of the following specification.

The accompanying drawing illustrates a selected embodiment of the invention and the views therein are as follows.

Figure 1:
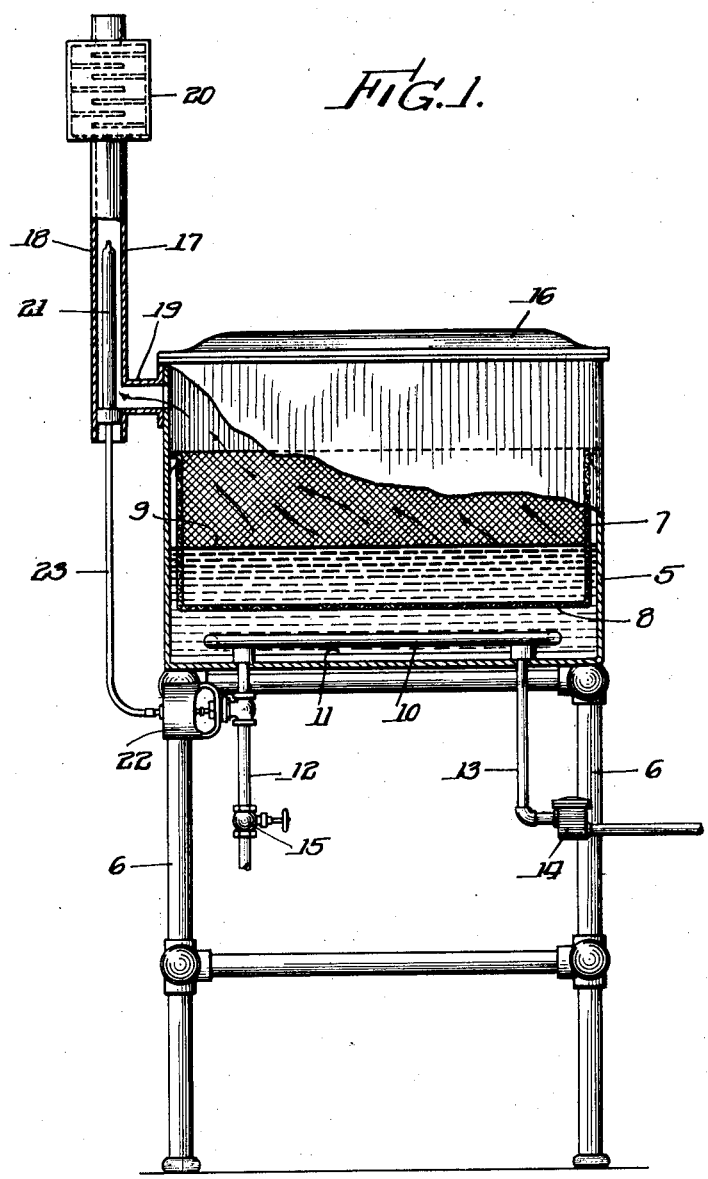
Fig. 1 is a detail view of a sterilizer and embodying the invention, certain parts being broken away for the sake of clearness.

The present invention is applied to a sterilizer, but it may be applied to other articles, such as a coffee urn, and boilers for process work. The sterilizer herein shown comprises a receptacle 5 of general rectangular shape and supported on legs 6. A screen member 7 for holding surgical instruments or other articles, has its bottom 8 above the water line 9. A heating coil arranged below the water line 10 is arranged between the bottom 11 of the sterilizing chamber and the bottom 8 of the supporting member for the purpose of heating the water in the sterilizer. A steam inlet line 12 is operatively connected to the coil, which coil is also provided with a return line 13. A steam trap 14 may be arranged in the return line for the usual purpose. A handle controlled valve 15 may be arranged in the fluid inlet line 12 for the purpose of shutting off the supply of steam or other heating fluid to the heating coil 10.

The receptacle 5 is provided with a cover 16 for the purpose of preventing the vapor from the water in the sterilizer from dissipating too rapidly into the atmosphere. In order to keep a pressure from building up inside of the receptacle, a vent line 17 is operatively connected to the sterilizer. The vent line comprises a vertical pipe 18 having a T-connection 19 at its lower end. The upper end of the pipe 18 is open to the atmosphere, but it may be preferable to arrange a condenser 20 near the upper end thereof for the purpose of preventing too much vapor from dissipating into the atmosphere.

A thermostat 21 is arranged in the vertical part 18 of the vent line 17 and is always in contact with the vapor passing through the vent line. The water in the receptacle will not boil violently until it has attained a boiling temperature of about 212° at which time steam will be generated. However, a vapor will generate from the water when the temperature is considerably lower than 212°, this vapor passing through the open vent line and in constant communication with the thermostatic element 21. Inasmuch as a vent 17 is provided, no pressure will build up in the receptacle to pre-heat the steam. It is advantageous that the water be sufficiently hot to sterilize instruments and at the same time be prevented from boiling violently so as to dissipate the water and discharge a relatively large amount of the steam into the atmosphere. The bulb or thermostatic element 21 is, therefore, arranged in the vent tube 19 where it is always in contact with the vapor passing through the vent tube. However, the temperature of the vapor in the vent tube will be less than the temperature in the sterilizer because the heat is dissipated by natural radiation through the walls of the receptacle and vent line.

A thermostatically controlled valve 22 is arranged in the fluid line 12 to limit the amount of steam passing into the coil 10 for heating the water to the proper temperature. The amount of steam passing through the heating coil must be sufficient to keep the water boiling, but must be insufficient to prevent the water from boiling violently. Therefore, the thermostat must operate to very close limits, it being understood that the water must always be kept boiling, but not violently. Therefore the thermostat must be positioned so that it will be incapable of supplying too much heating fluid to make the water boil violently, and at the same time prevent the heating fluid from being cut off entirely for a period long enough to cause the temperature of the water to be below the boiling point.

The thermostatic element or bulb 21 is arranged in the vent line and is filled with a thermal liquid so that when the temperature in the vent line reaches a certain point, the fluid in element 21 will expand, flow through the valve connecting line 23 and expand the diaphragm 24. When the diaphragm 24 is expanded a sufficient distance, it will move the valve stem 25 to the right, Fig. 2, and thereby move the valve member 26 against its valve seat 27 to close the valve. When the vapor in the vent 17 lowers, the fluid in the bulb 21 will contract permitting the thermal fluid to again be received in the bulb 21 permitting the spring 28 to move the valve member 26 to open position.

The amount of steam required to keep the water at a boiling point for satisfactory sterilization is far less than the amount of heat required to raise the temperature of the water and container from the starting temperature to 212° F. In the past it has been customary to use just the hand valve 15, but this operation has failed because of the negligence and the inability of the operator to reduce the valve to a point which will keep the water continually boiling, but not too violently. The amount of heat delivered by the heating coil has frequently caused the exhaust steam to be forced out from under the cover into the room because of the inability of the steam vent to discharge the steam, as generated. This latter fact has caused much unpleasantness for the operator as well as frequently damaging the walls and other equipment near the sterilizer. The present invention overcomes these former objections as the present pressure operated steam control valve will automatically reduce the amount of steam being admitted to the heating coil as the water comes to the boiling point. Due to the fact that there is little or no temperature differential between water at the boiling point and water which is rapidly changed into steam, with both at atmospheric pressure, it is impractical to place any thermostatic control in the water in the sterilizer with any kind of satisfactory results. It has been found, however, that satisfactory results are obtained by controlling the heat input into the container by the rate of evaporation from the surface of the liquid in the container. Due to the fact that the rate of evaporation and its corresponding absorption of heat from the heating coil is closely proportional to the quantity of steam being generated, the heat input into the heating coil may be controlled by the temperature of the exhaust vapor in view of the fact that the faster the evaporation, the faster the exhaust vapor must pass through the vent tube to the atmosphere.

A definite proportion of heat is absorbed by conduction so that it is possible to have water in the sterilizer at the boiling point and have all the heat of the vapor absorbed by the walls and cover of the sterilizer. As the rate of evaporation increases, there is an excess of heat and vapor which is not condensed by the cooling effect of the container and it must be thrown to the outside or else pressure will be built up, it being understood, of course, that cooling takes place all along the conducting walls of the sterilizer. By installing the thermostatic bulb 21 inside of the vent line 15, it is possible to secure a differential of pressure within the bulb due to the difference of temperature of the exhaust steam as it changes its rate of flow.

Figure 2:
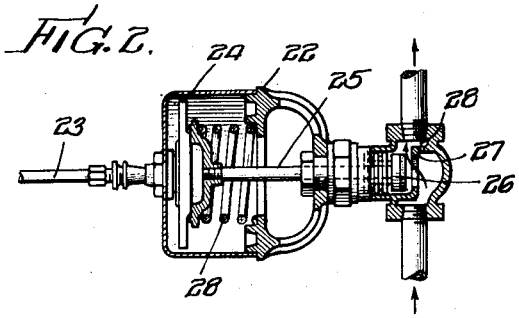
Fig. 2 is a detail sectional view through the valve.

In practice, it has been found desirable to drill a small hole 28 in the valve seat partition, Fig. 2, so that when the main valve is closed, this tiny opening will admit sufficient steam to assist in keeping the water boiling. It has been found that the ratio between the amount of steam required to heat the water within a few minutes, and the amount of steam to keep it boiling constantly cannot be satisfactorily secured by variation of the main valve opening. If the valve opening is very small, it could probably be done, but in actual practice it has been found that even though the valve is set very closely, the slightest variations in construction and mechanics, such as the expansion of the valve stem, the seating of the disc, etc., will cause trouble and make the valve close too tightly. To overcome these objections, the by-pass hole 28 has been made in the valve.

The placing of the thermostatic bulb 21 in the vent line and the constant contact with the vapor passing through the vent line and the provision of the by-pass hole 28 in the main valve will cause the water in the sterilizer to boil gently at all times and at the same time prevent the water from boiling too violently. Positioning the bulb elsewhere except within the outlet vent will not produce the same satisfactory results.

The invention has been described as applicable to steam sterilizers, and while the element used for heating purposes is described as a steam coil, other heating means, such as gas or electricity, may be used for heating the water.

The invention provides an extremely sensitive control for regulating the heat supply so that the water in the container may be kept boiling gently at all times, and at the same time be prevented from boiling too rapidly to generate an excess amount of steam.

Changes may be made in the form, construction, and arrangement of the parts without departing from the spirit of the invention or sacrificing any of its advantages, and the right is hereby reserved to make all such changes as fairly fall within the scope of the following claim.

The invention is hereby claimed as follows:

A sterilizer for sterilizing surgical instruments and the like comprising a normally closed receptacle for the sterilization of the instruments and containing water adapted to be brought to the sterilization point, means for preserving the water in the receptacle and to maintain the sterilization temperature of the water and comprising an instrument tray submerged in the water in the receptacle, means for heating the water, a vent line from the interior of the receptacle and leading to atmosphere whereby vapor created from the heating of the water in the receptacle will pass continually into the said vent line, means for condensing the vapor in the vent line whereby the condensation in the vent line will flow back into the receptacle through the vent line, temperature controlled means in the vent line and controlled by the temperature in the vent line, the temperature being controlled by the amount of vapor passing through the vent line, and means controlled by the temperature controlled means for controlling the operation of the water heating means.

FLOYD A. BLASHFIELD.
GUSTAVE F. LINDE.